May 20, 1952 A. W. FRIEND 2,597,237

VARIABLE LOSS PARAMAGNETIC CORES

Filed June 25, 1948

INVENTOR
Albert W. Friend
BY Philip G. Cooper
ATTORNEY

Patented May 20, 1952 2,597,237

UNITED STATES PATENT OFFICE 2,597,237

VARIABLE LOSS PARAMAGNETIC CORES

Albert W. Friend, Lawrenceville, N. J., assignor to Radio Corporation of America, a corporation of Delaware Application June 25, 1948, Serial No. 35,177

7 Claims. (Cl. 75—22)

This invention relates to paramagnetic cores for electrical inductances and the like, and particularly to a novel method of treating paramagnetic cores to provide a core having non-uniform losses and to variable loss cores obtained by such method.

Paramagnetic cores which have non-uniform or progressively increasing losses along a predetermined direction and a substantially constant magnetic permeability may find wide application. Thus, such cores might be used in tuning inductances to vary the Q of a resonant circuit without changing the resonant frequency thereof. The Q of a circuit is defined as the energy stored by the circuit divided by the energy dissipated per cycle of the resonant frequency of the circuit. Expressed mathematically:

$$Q=\frac{\omega L}{R}=\frac{2\pi f L}{R}$$

where $f$ is the resonant frequency of the circuit, L its inductance and R its resistance. The pass band of a circuit is dependent on the Q. Thus, when Q is larger than 3, the following relation holds:

$$Q=\frac{f}{f_2-f_1}$$

where $f_2$ is larger than $f$ which is larger than $f_1$. $f_2$ and $f_1$ are the frequencies where the response of the circuit which is unity for $f$, has been reduced to $$\sqrt{\frac{2}{2}}=.707$$

Accordingly, the pass band of the circuit is:

$$f_2-f_1=\frac{f}{Q}=\frac{R}{2\pi L}$$

The Q of a circuit accordingly determines the band width or pass band of a resonant circuit, provided $f$ remains constant. A core having progressively increasing or varying losses and a constant permeability may therefore be used to adjust the Q of a resonant circuit as used, for example, in the intermediate frequency transformer of a broadcast receiver. It may also find application in a variable attenuator circuit or it may be used in the transformer or in the deflection yoke of the deflection circuit for a television picture reproducing tube in order to adjust the damping of the circuit and thereby the linearity of the beam trace.

A broadcast receiver conventionally includes a signal frequency circuit whose resonant frequency is tunable within a predetermined frequency range. It may be desired to maintain constant the band width of the modulated wave passed by the signal frequency circuit in which case the Q of the circuit must vary with the frequency. It is conventional practice to tune the signal frequency circuit of a radio receiver by moving a paramagnetic core with respect to the coil of the resonant circuit. This will vary the inductance of the coil and thereby the resonant frequency of the circuit. In such a case, a variable loss core, that is, a core having non-uniform or progressively increasing losses can be used with advantage because the Q of the circuit tube can be varied inversely with the frequency to maintain the band width constant over a wide frequency range.

It is accordingly the principal object of the present invention to provide a method of producing a variable loss paramagnetic core and a variable loss core manufactured in accordance with the method.

A further object of the invention is to provide a paramagnetic core having a continuously increasing loss along a predetermined direction and a substantially constant permeability.

Another object of the invention is to provide a variable loss paramagnetic core for a resonant circuit to adjust the Q of the circuit by varying the relative position of the core with respect to the coil of the circuit without materially changing the inductance of the circuit.

In accordance with the present invention, there is provided a core consisting of comminuted paramagnetic particles electrically connected to each other by semi-conductive paths, the number of the paths varying in a predetermined manner along a predetermined direction such as the axis of the core. Thus, a change in the loss of the core is effected along the core axis. Such a core may consist of comminuted paramagnetic particles bonded together by a carbonaceous binder such as a resinous binder. The core may be manufactured by subjecting it to heat treatment which varies in such a manner that the binder becomes carbonized to an extent which changes along a predetermined direction of the core. It is feasible to vary the temperature to which the core is subjected along the core axis, or alternatively, the temperature may be maintained constant but the core may be subjected to the heat treatment for a time duration which varies along the axis.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
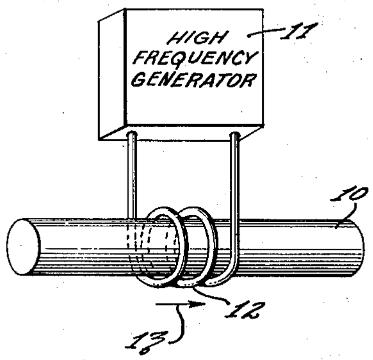
Fig. 1 is an elevational view of a paramagnetic core being subjected to a high frequency field.

Referring now to Fig. 1, there is illustrated paramagnetic core 10 which may be composed of powdered or comminuted iron or other finely divided paramagnetic or ferromagnetic materials. A paramagnetic material is defined as a material having a magnetic permeability greater than that of a vacuum, which is unity. The magnetic permeability of a paramagnetic material may be independent of the magnetizing force, or it may vary with the magnetizing force, in which case the material is called ferromagnetic.

A high permeability core may be obtained in the following manner. Low cost sponge iron and electrolytic iron powders are mixed with a very small amount of carbonaceous binder. The binder may consist of any organic material which will give a carbon residue when it is heated. Thus, for example, a resin binder is suitable and particularly a resin binder of the phenol formaldehyde type. The ferromagnetic powder and the binder are pressed into the desired shape under very high molding pressures. A molding pressure of between 15 and 60 tons per square inch has been used to reduce the inter-particle insulation furnished by the binder to a minimum thickness so that normally eddy currents can not flow in more than one particle of the ferromagnetic material.

In order to obtain the best electrical, magnetic and mechanical properties the optimum amount of the binder is about 0.75 per cent by weight. In a specific example for low frequency (5 to 200 kilocycles) operation, the maximum thickness of the ferromagnetic particles was about 0.0005 inch, and two phenol formaldehyde resins were used. One of the resins was a liquid resin containing about 90 per cent solids while the other was a finely divided solid resin. A core of this type may have a high permeability of the order of perhaps 50 to 250. The core may then be cured, that is, the core is heated to set the binder, which is usually called thermo-setting. This method of manufacturing a paramagnetic core is conventional and has been set forth, for example, in the copending application to Friend and Harding, Serial No. 781,804, filed on October 24, 1947 and entitled "Comminuted Ferromagnetic Cores" (RCA-10,697).

A heat treatment which permits a uniform increase of the loss of the entire core whereby the finished core has a uniform high loss has also been described in the copending application to Friend and Harding referred to. The purpose of this heat treatment is to convert the binder partially or totally to finely divided carbon. Thus, after the core has been cured, it may then be subjected to a temperature between approximately 800° to 1000° F. When the core is heated to 1000°, it may be subjected to this temperature for a duration of no more than about 20 minutes. On the other hand, when the core is heated to 800° only, it may be subjected to this temperature for a duration of perhaps 60 minutes. However, the length of time during which the temperature is applied is a function of the penetration of the heat into the core. When a core is heat treated in this manner the carbonaceous binder of the core is sufficiently carbonized to provide a number of semi-conductive paths between the ferromagnetic particles to obtain a high loss core.

If the core is heated to a sufficiently high temperature some of the ferromagnetic particles may be sintered together so as to connect them electrically. The effect of the heat treatment, accordingly, is to increase the conductive paths between the ferromagnetic particles in two ways. In the first place, the binder is at least partly converted to finely divided carbon particles which function as conductive paths. Secondly, sintering of the ferromagnetic particles increases the particle size and thereby the losses caused by eddy currents. In addition to the sintering, oxidation of the iron particles occurs at high temperatures. This has also been found to increase the losses of the core, and although it is not herein proposed to explain why oxidation of the iron particles increases the losses, there is undoubtedly a modification of the magnetic properties of the surface layers of the particles.

In accordance with the present invention, core 10 is subjected to such a heat treatment that the losses of the core will increase progressively along a predetermined direction such as the longitudinal axis of the core. Accordingly, core 10 which has been molded and cured in the manner explained herein, may then be heat treated by a high frequency electromagnetic field. To this end, there is provided high frequency generator 11 which is connected to coil 12 whose length is small compared to that of core 10. Core 10 is moved relatively to coil 12 as illustrated by arrow 13 at a non-uniform speed. The electromagnetic field developed by coil 12 will heat core 10 to the desired temperature which will be substantially uniform in the portion of coil 10 arranged within coil 12. By moving the core at a non-uniform speed with respect to coil 10 the duration of the heat treatment may be varied along the core axis and the resulting core will have a loss varying continuously along its axis. The permeability of the core remains substantially constant, unless excessive heat is applied. Generator 11 may develop a frequency in the neighborhood of 10 megacycles. It is to be understood, however, that frequencies as low as 10,000 cycles or less could be used.

Figure 2:
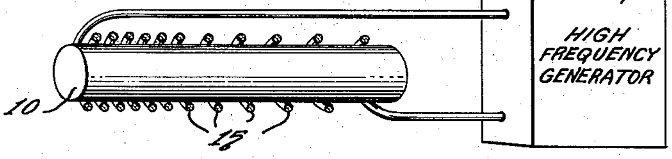
Fig. 2 is an elevational view of a paramagnetic core surrounded by a variable pitch coil energized by a high frequency generator.

In Fig. 2 there is illustrated another method of heat treating core 10 by high frequency generator 11 in order to obtain the novel non-uniform loss of the present invention. In this case, high frequency generator 11 is connected to coil 15 which has a variable pitch, as illustrated. During the heat treatment, core 10 remains fixed with respect to coil 15 but the mean strength of the electromagnetic field will differ along the axis of core 10. Accordingly, the temperature will differ along the core and the losses of the finished core 10 will increase continuously along the axis of the core, the variation of the loss being determined by the pitch of coil 15.

Figure 3:
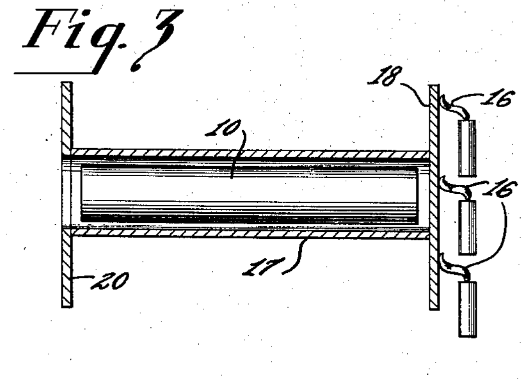
Fig. 3 is an elevational view, partly in section, of a paramagnetic core being subjected to a temperature varying along its axis.

A further arrangement for practicing the invention is shown in Fig. 3, in which core 10 is heated by means of flames shown schematically at 16. It is to be understood, however, that it is preferred to effect the heat treatment by a high frequency electromagnetic field in the manner explained in connection with Figs. 1 and 2. As illustrated in Fig. 3, core 10 is arranged in cylinder 17 which preferably consists of a heat conducting metal. The flames heat end plate 18 fixed to cylinder 17. The open end of cylinder 17 may be secured to cooling plate 20. The temperature gradient along cylinder 17 caused by heating end plate 18 by flames 16 will vary the temperature along the axis of core 10. The resulting core again has a variable loss along its axis.

Figure 4:
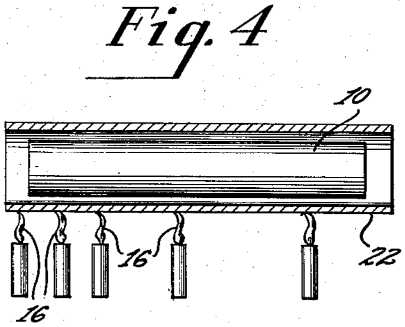
Fig. 4 is an elevational view, partly in section, of a paramagnetic core being subjected to a variable heat treatment.

Fig. 4 illustrates a modified method of heating core 10 by means of flames 16. Core 10 rests in a cylinder 22 of a heat conducting material such as a metal. Flames 16 are spaced in the manner illustrated so that the left hand portion of core 10 will be heated to a higher temperature than the right hand portion. Accordingly, the finished core will have higher losses at its left hand portion than at its right hand portion. If desired, to provide a very uniform product, cylinder 22 may be rotated during the heat treatment so that the temperature of each cross-sectional area will be substantially uniform.

It will accordingly be seen that core 10 may be heated in any suitable manner such as by an electromagnetic field or by the application of a flame. When core 10 is heated by a high frequency electromagnetic field, the heat penetrates uniformly through the entire thickness of the core. Accordingly, in that case, the duration of the heat treatment can be shorter than when the core is heated by the external application of the heat. The heat treatment is such that either the temperature changes along the core or that a fixed temperature is applied for a variable time duration to different portions of the core. It is to be understood that core 10 could be molded into any desired shape such as a cylinder or a rod having a square or a rectangular cross section. Alternatively, the core could be molded in toroidal shape.

Figure 5:
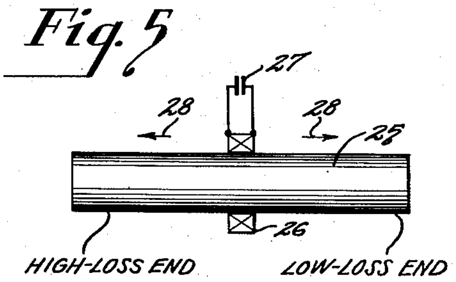
Fig. 5 is a schematic view of a variable loss core in accordance with the present invention which is utilized for varying the Q of a resonant circuit.

A variable loss paramagnetic core manufactured as described herein may find wide application. As illustrated, for example, in Fig. 5, variable loss paramagnetic core 25 may extend through inductance element 26 which may be resonated by capacitor 27. By moving core 25 in the direction of arrows 28, the loss of resonant circuit 26, 27 may be adjusted. Thus, resonant circuit 26, 27 may be the output or input circuit of an intermediate frequency amplifier in a superheterodyne receiver. By moving core 25 in the direction of arrows 28 the Q of the resonant circuit may be adjusted and accordingly the band width of the circuit. It is assumed, of course, that the magnetic return path remains essentially fixed when core 25 is adjusted. This may be achieved by utilizing a core 25 which is long compared to coil 26.

Figure 6:
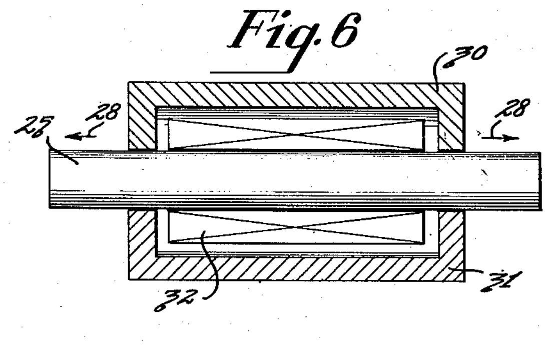
Fig. 6 is an elevational view, partly in section, of a variable loss core embodying the present invention and arranged in a shunting frame from a coil.

It is also feasible to maintain the magnetic return path fixed in the manner illustrated in Fig. 6. In that case, paramagnetic core 25 is arranged in shunting frame 30, 31 which houses coil 32. Shunting frame 30, 31 may consist of two portions as disclosed and claimed in the copending application to Friend Serial No. 619,870, filed on October 2, 1945, now Patent No. 2,513,160, dated June 27, 1950 and entitled "Transformer" (RCA 24,237). It is, however, also feasible to use a one part shunting frame although a shunting frame consisting of two parts such as 30, 31 reduces the effective reluctance of the air gap. The Q of coil 32 may be adjusted by moving core 25 in the direction of arrows 28 so that a higher or lower loss portion is arranged in coil 32. Shunting frame 30, 31 provides a magnetic return path of fixed reluctance and loss properties for core 25 and coil 32.

It is to be understood that the variable loss core of the present invention may also be used for other purposes such as to vary the attenuation of a circuit. It is also feasible to utilize a core in accordance with the invention for tuning a resonant circuit and for varying its Q inversely with variations of the resonant frequency of the circuit. This may be done in the signal frequency input circuit of a broadcast receiver. The variable loss core of the present invention may further be used for adjusting the damping in the output transformer or deflection yoke of the deflection circuits of a television receiver. By adjusting the damping of the circuit the linearity of the trace on the target of the picture reproducing tube may be controlled. Other applications of the core of the invention will readily suggest themselves.

There has thus been described a method of manufacturing a variable loss paramagnetic core and a core produced in accordance with the novel process. The core has a loss which varies or changes continuously along its axis.

What is claimed is:

1. A ferromagnetic core for tuning inductances and the like, comprising a body of ferromagnetic particles and a carbonaceous binder having electrically conducting carbonized particles included therein in increasing concentration per unit of volume along a predetermined direction through the core, and having a resultant eddy current loss increasing along said predetermined direction and a permeability which is substantially constant along said direction.

2. A core for an inductance device consisting of comminuted and sintered paramagnetic particles electrically connected to each other, and means therebetween providing electrical semi-conductive paths, said means comprising carbonized particles of carbonaceous binder material varying in concentration per unit of volume along a predetermined direction of said core to effect a variation in the loss of said core along said direction.

3. An electrical inductance core consisting of a mixture of comminuted ferromagnetic particles, electrically non-conducting carbonaceous binder material, and finely divided carbonized particles of said material in varying concentration per unit of volume along a predetermined direction of said core, said last named particles being at least semi-conducting electrically, thereby to effect a variation in the loss of said core along said direction without substantially affecting the permeability of said core.

4. An electrical inductance core consisting of a mixture of comminuted ferromagnetic particles, resinous binder material, and finely divided carbonized particles of said material varying in concentration per unit of volume continuously along a predetermined direction of said core, said last named particles being electrically conducting thereby to effect a continuous variation in the loss of said core along said direction without substantially changing the permeability of said core.

5. A core for an electrical inductance consisting of a body of comminuted ferromagnetic particles and a carbonaceous material as a binder therefor, said material being carbonized and electrically conducting to an extent varying in a predetermined manner along a predetermined direction of said core, and some of said ferromagnetic particles being in sintered electrical contact with each other, the number of said contacting particles varying in concentration per unit of volume along the core in said direction, thereby to effect a variation in the loss of said core along said direction without substantially affecting the permeability of said core.

6. A core for electrical inductance devices and the like, consisting of comminuted ferromagnetic particles and a carbonaceous binder, said particles being in sintered contact and of increasing size along a predetermined direction of said core, thereby to effect a variation in the eddy current loss of said core along the core in said direction without substantially varying the permeability of said core.

7. A core consisting of comminuted paramagnetic particles and a carbonaceous binder, as defined in claim 6, wherein said particles are further oxydized to an extent varying along said predetermined direction to effect additional variation in the loss of said core along said direction.

ALBERT W. FRIEND.

REFERENCES CITED

The following references are of record in the file of this patent:

UNITED STATES PATENTS

| Number | Name | Date |
| --- | --- | --- |
| 1,793,757 | Smith | Feb. 24, 1931 |
| 1,878,539 | Reinhardt et al. | Sept. 20, 1932 |
| 1,881,711 | Lathrop | Oct. 11, 1932 |
| 2,064,773 | Vogt | Dec. 15, 1936 |
| 2,172,548 | Schwarzkopf | Sept. 12, 1939 |
| 2,192,743 | Howe | Mar. 5, 1940 |
| 2,268,782 | Stier | Jan. 6, 1942 |
| 2,418,467 | Ellis | Apr. 8, 1947 |